United States Patent

Steinmetz et al.

[11] Patent Number: 5,532,459
[45] Date of Patent: Jul. 2, 1996

[54] WELDING SLEEVE OF THERMOPLASTIC MATERIAL

[75] Inventors: Hans W. Steinmetz, Schaffhausen; Dirk A. Petry, Feuerthalen, both of Switzerland

[73] Assignee: Georg Fischer Rohrleitungssysteme AG, Schaffhausen, Switzerland

[21] Appl. No.: 309,772

[22] Filed: Sep. 21, 1994

[30] Foreign Application Priority Data

Sep. 22, 1993 [DE] Germany ............... 43 32 196.8

[51] Int. Cl.$^6$ .................. H05B 3/58; F16L 13/02
[52] U.S. Cl. .................. 219/535; 219/544; 285/22; 285/292
[58] Field of Search .................. 219/535, 544, 219/541, 385, 390; 285/21, 22, 292, 286, 417

[56] References Cited

U.S. PATENT DOCUMENTS

| | | | |
|---|---|---|---|
| 3,943,334 | 3/1976 | Sturm | 219/535 |
| 4,147,926 | 4/1979 | Stahli | 219/535 |
| 4,375,591 | 3/1983 | Sturm | 219/535 |
| 4,634,844 | 1/1987 | Lodder | 219/544 |
| 4,931,116 | 6/1990 | Rosenzweig | 219/535 |
| 5,255,943 | 10/1993 | Keller et al. | 219/535 |

FOREIGN PATENT DOCUMENTS 4203626  8/1993  Germany .................. 219/535

Primary Examiner—Teresa J. Walberg
Assistant Examiner—Sam Paik
Attorney, Agent, or Firm—Bachman & LaPointe

[57] ABSTRACT

The welding sleeve has a coil of a resistance wire forming two heating zones and is arranged near the inner circumference of the sleeve. Each heating zone has a region at the beginning and end in which the coil spacing is less than in the center region.

7 Claims, 1 Drawing Sheet

WELDING SLEEVE OF THERMOPLASTIC MATERIAL

BACKGROUND OF THE INVENTION

The invention relates to a welding sleeve of thermoplastic material for joining tubular thermoplastic parts.

Welding sleeves are known (for example in U.S. Pat. No. 3,943,334) which have one or two heating zones of a spiral heating coil for joining two tubular plastic parts. Each heating zone has a uniform heating capacity over its length. Since the heat loss at the ends of each heating zone due to heat emission to the edge zones of the sleeve body is greater than the center region of the welding zone, the temperature distribution is irregular which is disadvantageous for satisfactory welding. Either overheating with damage to material may occur in the center region of the welding zone, or unsatisfactory welding may be produced at the ends of the heating zone.

It is the principle object of the present invention to provide a welding sleeve of the above type whose heating coil is designed for uniform heat distribution in the one or more than one heating zone to achieve satisfactory welded joints.

SUMMARY OF THE INVENTION

The foregoing object is achieved by way of the present invention. In accordance with the present invention, the welding sleeve comprises a sleeve body formed of a thermoplastic material, the sleeve body having a surface; a resistance wire coiled on the surface of the sleeve body so as to define a heating zone of the length $L_2$, the heating zone having a center region of length $L_3$ flanked by two side regions of length $L_1$ wherein the pitch of the resistance wire between adjacent coils in the two side regions is smaller than the pitch in the center region.

Further advantages of the present invention will appear hereinbelow.

BRIEF DESCRIPTION OF THE DRAWINGS

The invention is shown by way of example in the attached drawings and is described below. The drawings show.

DETAILED DESCRIPTION OF PREFERRED EMBODIMENTS

Figure 1:
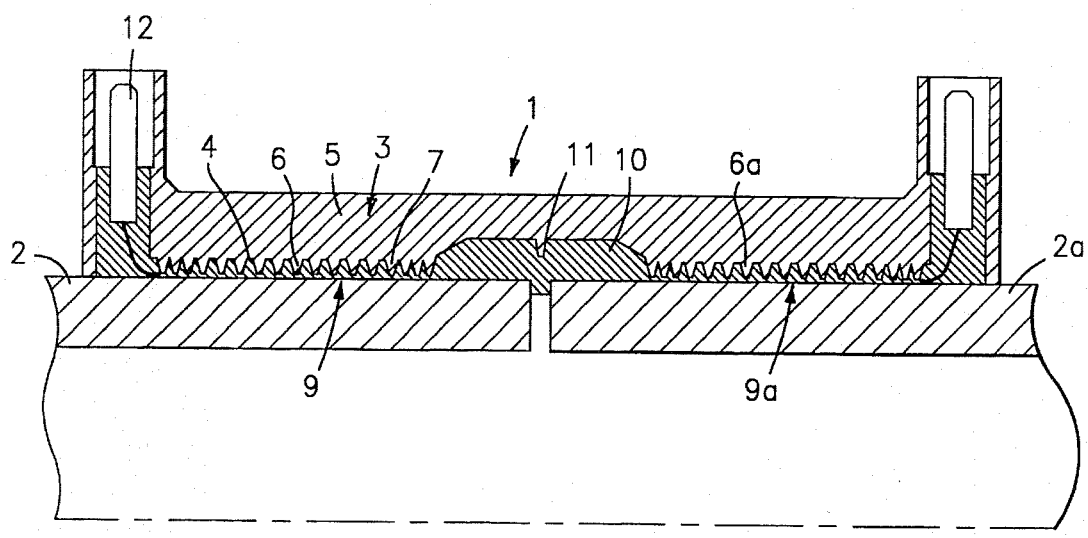
FIG. 1 is a half-side longitudinal section of a welding sleeve.

FIG. 1 shows a welding sleeve 1 for joining tubular line parts 2, 2a of thermoplastic material. A sleeve body 3 consists of an inner sleeve portion 4 and an outer sleeve portion 5. The inner sleeve portion 4 has two groove portions 6, 6a in whose grooves 7 a resistance wire 8 is laid. As can be seen in the figures, the outer sleeve portion 5 has projection means or teeth for mating in the groove 7.

The two groove portions 6, 6a each form a heating zone 9, 9a for welding the tubular line parts 2, 2a with the welding sleeve. The two heating zones 9, 9a are joined together by a connecting portion 11 of the resistance wire 8 guided over a thicker wall portion 10 of the inner sleeve portion 4 lying in between the heating zones 9, 9a for separating same. The resistance wire 8 is provided at both its ends with an electrical terminal 12 which is preferably constructed as a contact pin. In accordance with the present invention, in the side regions 13 and 13a at the beginning and at the end of each heating zone 9, 9a the pitch 15 and hence the coil spacing is less than in the center region 14 ($L_3$ in FIG. 2). The term "pitch" as used herein means the distance between the center of adjacent coils of the resistance wire.

Figure 2:
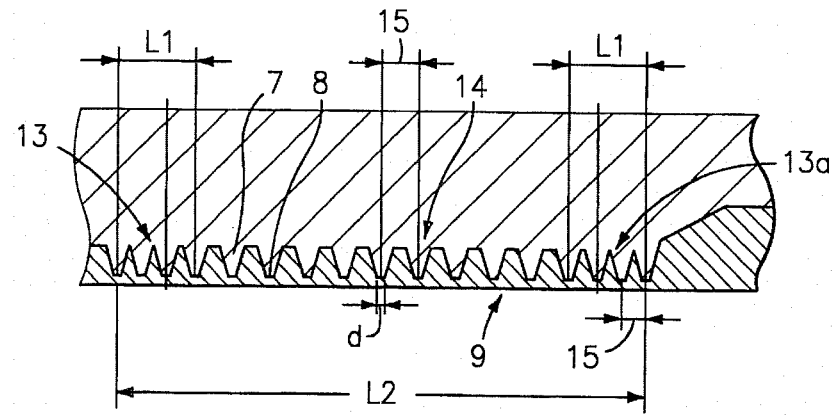
FIG. 2 is an enlargement of a partial longitudinal section of a heating zone of FIG. 1.

The pitch or coil spacing 15 preferably increases in the side regions 13, 13a to the direction of the center region 14 where the coil spacing 15 remains the same (see FIG. 2). In the regions 13, 13a the coil spacing 15 is 2 to 5 times the diameter (d) of the resistance wire 8 and in the center region 14 it is 5 to 8 times the diameter (d) of the resistance wire 8.

The length $L_1$ of regions 13, 13a is preferably 15 to 25% of the entire length $L_2$ of the heating zone 9, 9a.

Due to the greater closeness of the windings at the beginning and end of each heating zone a greater heating capacity is produced in the side regions 13, 13a, giving rise to a compensation for the greater heat losses occurring in these regions so that a uniform welded joint is achieved in the entire region of the heating zone.

In the case of the welding sleeve 1 described the inner sleeve portion 4 with the grooves 7 is produced by injection molding, the resistance wire 8 is then wound on to it, laid into an injection mold, and the outer sleeve portion 5 is produced by injection round, the completed welding sleeve being produced by joining both sleeve portions 4, 5.

The arrangement of the resistance wire 8 of the invention in the one or more than one heating zones 9, 9a is also possible with welding sleeves having a resistance wire laid in grooves on the inner circumference of the sleeve body 3, or with welding sleeves in which the resistance wire 8 is wound onto a mandrel and the sleeve body 3 is then produced in an injection mold. In these embodiments, the welding sleeve has a one-part sleeve body 3.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A welding sleeve comprising: a sleeve body formed of a thermoplastic material, the sleeve body having a surface; a resistance wire coiled on the surface of the sleeve body, separation means on the sleeve body for separating said resistance wire so as to define two heating zones of length $L_2$, each of the heating zones having a center region of length $L_3$ flanked by two side regions of length $L_1$ wherein the length $L_1$ is less than the length $L_3$, each of said two side regions of length $L_1$ has a resistance wire pitch and said center region of length $L_3$ has a resistance wire pitch wherein the pitch of the resistance wire between adjacent coils in the two side regions is smaller than the pitch of the resistance wire in the center region.

2. A welding sleeve according to claim 1 wherein the sleeve body comprises an inner sleeve portion provided with groove means for securing the resistance wire and an outer sleeve portion provided with projection means for engaging said groove means wherein the resistance wire is positioned in the groove means.

3. A welding sleeve according to claim 1 wherein the pitch of the resistance wire between adjacent coils in the two side regions increases in the direction of the center region.

4. A welding sleeve according to claim 1 wherein the pitch of the resistance wire between adjacent coils in the two side regions is between 2 to 5 times the diameter of the resistance wire and the pitch of the resistance wire between adjacent coils in the center region is between 5 to 8 times the diameter of the resistance wire.

5. A welding sleeve according to claim 1 wherein the length $L_1$ of each side region is 15 to 25% of the length $L_2$ of the center region.

6. A welding sleeve according to claim 1 wherein the two heating zones are spaced from each other by said separation means which comprises a thermoplastic portion and are joined together by a connecting wire portion which extends over the plastic portion.

7. A welding sleeve according to claim 6 wherein the inner sleeve has a thickness and the thermo plastic portion comprises a thicker wall portion of the inner sleeve.

* * * * *